United States Patent
Petrescu et al.

(10) Patent No.: US 10,204,166 B2
(45) Date of Patent: Feb. 12, 2019

(54) RANKING CONTENT ITEMS BASED ON SESSION INFORMATION

(71) Applicant: Facebook, Inc., Menlo Park, CA (US)

(72) Inventors: Alexandru Petrescu, Shoreline, WA (US); Mahmud Sami Tas, Sunnyvale, CA (US); Syed Shahbaz Ahmed, Redmond, WA (US); Sarah T. Rowe, Seattle, WA (US); Ansha Yu, Sunnyvale, CA (US); Guannan Zhang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 218 days.

(21) Appl. No.: 15/260,896

(22) Filed: Sep. 9, 2016

(65) Prior Publication Data
US 2018/0075146 A1 Mar. 15, 2018

(51) Int. Cl.
G06F 17/30 (2006.01)
(52) U.S. Cl.
CPC .... G06F 17/30867 (2013.01); G06F 17/3053 (2013.01)
(58) Field of Classification Search
CPC .................. G06F 17/30867; G06F 17/3053
USPC ....................................................... 707/734
See application file for complete search history.

(56) References Cited

U.S. PATENT DOCUMENTS

| | | | |
|---|---|---|---|
| 6,012,053 A | 1/2000 | Pant et al. | |
| 6,041,311 A | 3/2000 | Chislenko et al. | |
| 6,112,186 A | 8/2000 | Bergh et al. | |
| 6,266,060 B1 | 7/2001 | Roth | |
| 6,526,440 B1 * | 2/2003 | Bharat | G06F 17/30864 707/999.003 |
| 6,873,982 B1 | 3/2005 | Bates et al. | |
| 7,584,290 B2 | 9/2009 | Ruskin et al. | |
| 7,844,592 B2 | 11/2010 | Shoval et al. | |
| 7,933,338 B1 * | 4/2011 | Choudhry | G06F 17/30781 375/240.26 |

(Continued)

FOREIGN PATENT DOCUMENTS

| | | |
|---|---|---|
| WO | WO 2015/041727 A1 | 3/2015 |
| WO | WO 2015/103540 A1 | 7/2015 |

OTHER PUBLICATIONS

Brampton, Andrew, et al., "Characterising Use Interactivity for Sports Video-on-Demand", NOSSDAV '07, Urbana, IL, © 2007, 6 pages.*

(Continued)

*Primary Examiner* — Robert Stevens
(74) *Attorney, Agent, or Firm* — Fenwick & West LLP

(57) ABSTRACT

An online system provides a continuous feed of content items to a client device. The online system maintains an ordered set of ranked content items for sending to the client device. The online system receives requests from the client device for content items and selects a subset from an ordered set of ranked content items in response to each request. The number of content items in the subset may be based on factors such as the network connection strength of the client device. The client device re-ranks content items received from the online system based on information received during a given session. The session information may indicate the types of content items viewed during the given session, or the speed at which the user is viewing content items during the given session.

18 Claims, 9 Drawing Sheets

(56) References Cited

U.S. PATENT DOCUMENTS

| | | | |
|---|---|---|---|
| 8,090,625 B2 | 1/2012 | Yi | |
| 8,645,390 B1 | 2/2014 | Oztekin et al. | |
| 8,661,029 B1* | 2/2014 | Kim | G06F 17/3053 707/723 |
| 8,886,637 B2 | 11/2014 | Bennett | |
| 8,938,500 B1* | 1/2015 | Acharya | G06Q 50/01 705/319 |
| 9,208,251 B2 | 12/2015 | Mawhinney et al. | |
| 9,727,644 B1* | 8/2017 | Teng | G06F 17/30861 |
| 9,965,526 B1 | 5/2018 | Chanda | |
| 2002/0103798 A1 | 8/2002 | Abrol et al. | |
| 2012/0158527 A1 | 6/2012 | Cannelongo et al. | |
| 2014/0019544 A1 | 1/2014 | Palmert | |
| 2015/0039601 A1* | 2/2015 | Harrang | G06F 17/30867 707/727 |
| 2015/0081449 A1* | 3/2015 | Ge | G06F 17/30867 705/14.66 |
| 2015/0142607 A1* | 5/2015 | Yang | G06Q 30/0631 705/26.62 |
| 2015/0237147 A1* | 8/2015 | Sundaresan | H04W 4/21 709/203 |
| 2017/0262533 A1* | 9/2017 | Chang | G06F 17/30675 |

OTHER PUBLICATIONS

Agichtein, E., et al., "Improving Web Search Ranking by Incorporating User Behavior Information", *SIGIR '06*, Seattle, WA, Aug. 6-11, 2006, pp. 19-26.

Cai, F. et al., "Personalized Document Re-ranking Based on Bayesian Probabilistic Matrix Factorization", *SIGIR '14*, Gold Coast, OLD, Australia, Jul. 6-14, 2014, pp. 835-838.

Liu, J. et al., "Personalized News Recommendation Based on Click Behavior", *IUI '10*, Hong Kong, China, Feb. 7-10, 2010, pp. 31-40.

Wang, K. et al., "PSkip: Estimating Relevance Ranking Quality from Web Search Clickthrough Data", *KDD '09*, Paris, France, Jun. 28-Jul. 1, 2009, pp. 1355-1363.

White, R.W. et al., "Predicting Short-Term Interests Using Activity-Based Search Context", *CIKM '10*, Toronto, Canada, Oct. 26-30, 2010, pp. 1009-1018.

Yi, X., et al., "Beyond Clicks: Dwell Time for Personalization", *RecSys '14*, Foster City, CA, Oct. 6-10, 2014, pp. 113-120.

* cited by examiner

Unreliable Network Connection

Reliable Network Connection

RANKING CONTENT ITEMS BASED ON SESSION INFORMATION

BACKGROUND

1. Field of Art

This description generally relates to ranking content items, and particularly to ranking content items based on session specific information of a client device.

2. Description of the Related Art

An online system allows its users to connect to and communicate with other users of the online system. Users may create user profiles on the online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for individuals or third parties to share different types of content.

Users often view and access content from online systems via mobile devices such as smart phones. If a mobile device has a reliable network connection, then new content is promptly downloaded to the device. However, if the device has a weak network connection, the user may not have access to updated content on the device. Conventional techniques do not provide satisfactory experiences to users with mobile devices with weak network connections because users may run out of new content on their device. Additionally, they may have to manually request and wait for new content to be downloaded. Online systems that provide poor user experience are likely to lose their user base over time.

SUMMARY

A client device re-ranks content items received from an online system. The client device receives content items that are previously ranked by the online system. A user of the client device can interact with the content items during different sessions. The client device re-ranks the content items based on information received during a given session. For example, the information indicates which types of content items the user is viewing most frequently during the given session, or the speed at which the user is viewing content items during the given session. Re-ranking based on session-specific information provides a more up-to-date order of content items because the online system does not necessarily have access to the session-specific information in real-time from the client device, especially if the client device has an unreliable network connection.

According to one embodiment, a client device of a user receives an ordered set of content items ranked in an order by an online system. The client device receives detects the start of a session. The client device receives session information describing actions performed by the user using the client device since the start of the session. The client device generates session scores for the content items. A session score for a content item is determined based on the session information and indicates a likelihood that the user will interact with the content item. The client device modifies the order of the set of content items based on the session scores. The client device displays the content items on the client device in the order. In an embodiment, the ranking of the content items based on the session information is performed by the online system.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
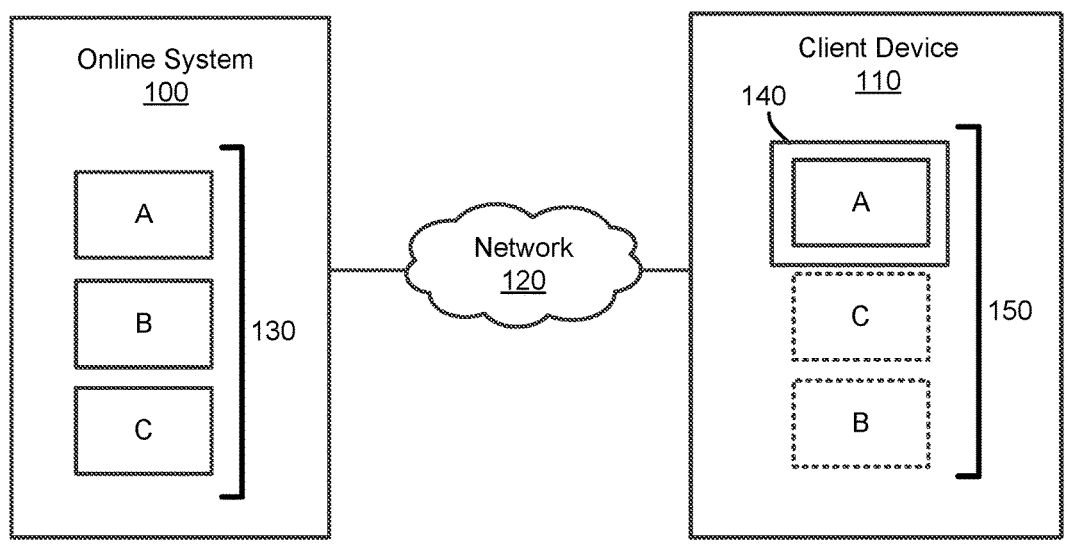
FIG. 1 is a diagram of a system environment for providing and ranking content items according to one embodiment.

FIG. 1 is a diagram of a system environment for providing and ranking content items according to one embodiment. The system architecture includes an online system 100 and a client device 110 connected to each other over a network 120. In other embodiments, different and/or additional entities can be included in the system architecture.

The client device 110 is a computing device capable of receiving user input as well as transmitting and/or receiving data via the network 120. A client device 110 is a device having computer functionality, such as a smartphone, personal digital assistant (PDA), a mobile telephone, or another suitable device. A client device 110 is configured to communicate via the network 120. In one embodiment, a client device 110 executes an application allowing a user of the client device 110 to interact with the online system 100. For example, a client device 110 executes a browser application to enable interaction between the client device 110 and the online system 100 via the network 120. In another embodiment, a client device 110 interacts with the online system 100 through an application programming interface (API) running on a native operating system of the client device 110, such as IOS® or ANDROID™.

The network 120 includes any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (Wi-MAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The online system 100 includes a computing environment that allows users of the online system 100 to communicate or otherwise interact with each other and access content. A user interacts with the online system 100 via a graphical user interface 140 of the client device 110. The client device 110 executes an application associated with the online system 100 that presents a user interface based on information from the online system 100. Further, the user interacts with the online system 100 in one or more sessions. The system (a system refers to either the client device 110 or the online system 100) receives information describing the sessions created by the user. The system detects the start of a session based on the information. A session is associated with a sequence of interactions between the client device and the online system. The system receives information describing a start time and an end time for the session. For example, the start time indicates a time at which the user begins executing an application and the end time indicates a time at which the user closes the application. In an embodiment, the system detects the start of a session as a request received by the online system and sent by the client device after more than a threshold time has passed since the last request sent by the client device to the online system. In some embodiments, the system receives information indicating the end time as a time at which the user begins interacting with another application (that may or may not be associated with the online system 100) on the client device 110. In another example, the system determines the end time as a time at which the user has not interacted with the online system 100 for more than a threshold duration of time. For example, if the user leaves the application running on the client device 110, but has not interacted with the online system 100 for the past 10 minutes. If the threshold duration is 10 minutes, then the system determines that the session ends after the 10 minutes of idle time has elapsed. In an embodiment, the system adjusts the threshold duration based on various factors, for example, the time of the day or user interaction patterns of individual users. For instance, the threshold duration may be longer during the evenings when a user is more likely to interact with the online system 100 than during the mornings. Similarly, a particular user may be more likely to have pauses between interactions compared to other users and accordingly, the online system adjusts the threshold for the particular user to be higher than the threshold values for the other users.

The online system 100 stores information about the users, for example, user profile information and information about actions performed by users on the online system 100. Based on the stored information, the online system 100 generates and ranks content items. Content items include information from the online system 100, e.g., stored user profile information, user action information, or information from objects in general stored on the online system 100. Content items may also include sponsored content provided by a third party outside of the online system 100. Content items can include any combination of text, different types of media (e.g., images and videos), or universal resource locators (URL). In an embodiment, the online system 100 generates an ordered set of content items that have previously been ranked. The online system 100 provides subsets of the ordered set of content items to the client device 110 in response to receiving a request for content items from the client device 110. The online system 100 re-ranks the ordered set in between requests from the client device 110. An ordered set is a data structure representing the content items that allows various modules of the online system to add or remove content items from the data structure. The ordered set maintains the content items in a particular order. Accordingly, if a module requests a content item from the ordered set, the online system 100 selects a content item from the ordered set based on the ranking, for example, the content item ranked highest in the ordered set, removes the content item from the ordered set, and provides the content item to the requesting module. If a module adds a new content item to the ordered set, the online system 100 determines the ranking score for the new content item, determines a position of the new content item in the ordered set and adds the new content item at the appropriate position in the ordered set based on the ranking. In other embodiments, the online system users other types of data structures instead of an ordered set, for example, any representation of ordered sets such as a heap, a tree representation, for example, height balanced trees, and so on.

In the example use case shown in FIG. 1, the online system 100 has an ordered set 130 of three ranked content items in the order of A, B, and C. The online system 100 provides the ordered set 130 to the client device 110. The client device 110 re-ranks the ordered set 130 into the ordered set 150 of re-ranked content items based on session information. In particular, the content item C is ordered ahead of the content item B. Session information includes information recorded by the client device 110 during a session. The client device 110 displays content items in the graphical user interface 140 for presentation to a user using the client device 110. Typically, the graphical user interface 140 shows one or more content items in an ordered set, but not all of the content items stored on the client device 110. The graphical user interface 140 allows users to view additional content items by scrolling through the ordered set of content items. For example, the graphical user interface 140 only shows content item A. The user can scroll down the ordered set 150 to view content items C and B. In some embodiments, the online system 100 ranks the content items such that content items at the beginning of the ordered set are more likely to be of interest to the user, and thus the client device 110 displays those content items first.

II. Online System

Figure 2A:
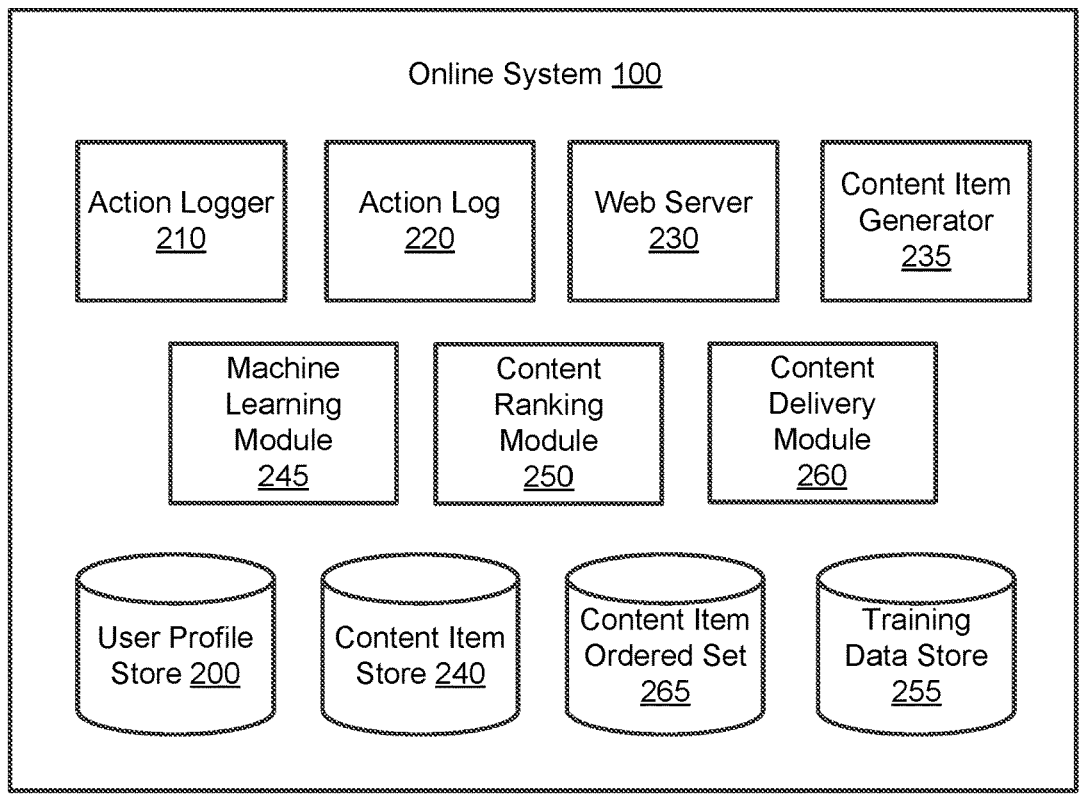
FIG. 2A is a block diagram of a system architecture of an online system according to one embodiment.

FIG. 2A is a block diagram of a system architecture of the online system 100 according to one embodiment. The online system 100 includes a user profile store 200, action logger 210, action log 220, web server 230, content item generator 235, content item store 240, machine learning module 245, content ranking module 250, training data store 255, content delivery module 260, and content item ordered set 265. In other embodiments, the online system 100 includes additional, fewer, or different components for various applications. In an embodiment, the online system is a social networking system that allows users to establish connections with other users and interact with the other users. Such online system provides content items to a user as news feed describing actions performed by other users connected to the user. Conventional components such as network interfaces, security functions, load balancers, failover servers, management and network operations consoles, and the like are not shown so as to not obscure the details of the system architecture.

The user profile store 200 stores user profiles associated with each user of the online system 100. A user profile includes declarative information about the user that was explicitly provided by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, gender, hobbies or preferences, location and the like.

A user profile may also store other information provided by the user, for example, images or videos. In certain embodiments, images of users may be tagged with identification information of users of the online system 100 displayed in an image. A user profile in the user profile store 200 may also maintain references to actions by the corresponding user performed on the online system 100. The user profile store 200 further stores data describing one or more relationships between different users and allows users to specify their relationships with other users, e.g., the user's connections. For example, these user-defined relationships allow users to generate relationships with other users that parallel the user's real-life relationships, such as friends, co-workers, partners, and the like.

The action logger 210 receives communications about user actions internal to and/or external to the online system 100, populating the action log 220 with information about user actions. Examples of actions include adding a connection to another user, sending a message to another user, uploading an image, reading a message from another user, viewing content associated with another user, or attending an event posted by another user. In addition, a number of actions may involve an object and one or more particular users, so these actions are associated with those users as well and stored in the action log 220.

The action log 220 may be used by the online system 100 to track user actions on the online system 100, as well as actions on third party systems that communicate information to the online system 100. Users may interact with various objects on the online system 100, and the action logger 210 stores information describing these interactions in the action log 220. Examples of interactions with objects include: commenting on posts, sharing links, and checking-in to physical locations via a client device, accessing content items, and any other interactions. Additional examples of interactions with objects on the online system 100 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction.

Additionally, the action log 220 may record a user's interactions with sponsored content on the online system 100 as well as with other applications operating on the online system 100 if the online system 100 has been granted access. In some embodiments, data from the action log 220 is used to infer interests or preferences of a user, augmenting the interests included in the user's user profile and allowing a more complete understanding of user preferences and types of content items that the user would likely to interact with. The action log 220 can record information about client devices 110 that a user uses to interact with the online system 100. For example, the action log 220 records whether the user used a laptop computer or smartphone to interact with the online system 100. Further, the action log 220 may include information about the types of client devices 110, e.g., smartphone running an IOS® or ANDROID™ operating system.

The action log 220 may also store user actions taken on a third party system, such as an external website, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 220 can record information about actions that users perform on a third party system including webpage viewing histories, sponsored content that were engaged, purchases made, and other patterns from shopping and buying.

The web server 230 links the online system 100 via the network 120 to the one or more client devices 110. The web server 230 serves web pages, as well as other web-related content, such as JAVA®, FLASH®, XML and so forth. The web server 230 may receive and route messages between the online system 100 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 200. Additionally, the web server 230 may provide application programming interface (API) functionality to send data directly to native client device operating systems, such as IOS®, ANDROID™, WEBOS® or RIM®.

The content item generator 235 generates content items for presentation to users of the online system 100. The content item generator 235 stores content items in the content item store 240. The content item generator 235 can analyze information stored in the user profile store 200 or action log 220 to identify information useful for generating content items. Based on the analyzed information, the content item generator 235 generates content items for users. In an embodiment, the content item generator 235 receives content items from external systems, for example, external content provider systems. Content items may be customized for a particular user. A content item may be a sponsored content item describing a product or service that the user is likely to be interested in or likely to purchase because the user previously liked or commented on content items including similar products or services.

The machine learning module 245 uses machine learning techniques to train content ranking models. The content ranking module 250 uses the trained content ranking models to rank content items generated by the content item generator 235 or stored in the content item store 240. In one embodiment, the content ranking module 250 takes input information about a given user of the online system 100 and a content item. Based on the input information and the trained content ranking models, the content ranking module 250 determines a ranking score. The ranking score indicates a likelihood that the given user will be interested in the content item or interact with the content item.

In an embodiment, the online system 100 includes multiple content ranking modules 250, e.g., a content ranking module 250 for each user or group of users of the online system. The groups of users may be organized based on demographic information (e.g., age range, gender, or education level of users), geographical location, or other types of information, e.g., from the user profile store 200 or action log 220. Each content ranking module 250 can use a content ranking model trained by the machine learning module 245 using features specific to the corresponding user or group of users. By customizing content ranking modules 250 for different users, the online system 100 can provide more accurate ranking scores. For instance, a user's—or group of users'—interests may be different than another user's interests, and thus the two users would likely interact with different types of content items.

The machine learning module 245 trains the content ranking models using features extracted from training data from the training data store 255. The training data may include information from the user profile store 200, the action log 220, the content item store 240, or provided by an expert to the online system 100. The machine learning module 245 can periodically re-train the content ranking models using features based on updated training data.

The machine learning module 245 may train the content ranking models by extracting features from content items for which the ranking has already been determined and creating a feature vector. Dimensionality reduction (e.g., via linear discriminant analysis, principle component analysis, etc.) may be used to reduce the amount of data in the feature vector to a smaller, more representative core set of features. Features extracted from text include keywords and features extracted from video or images may include text (e.g., metadata associated with the image or video), color, texture, motion rigidity, audio, etc. The training set for the content ranking models that will be used is a subset of the overall data set that is representative of the data to be ranked, including positive and negative examples of the ranking of content items on which the model is being trained. In supervised training, rankings of example content items representing specific features are provided as training sets. The training process provides content ranking models that can then be used to rank content items that the model has not encountered before. Machine learning algorithms used include support vector machines (SVMs), boosting for other algorithms (e.g., AdaBoost), neural net, logistic regression, naïve Bayes, memory-based learning, random forests, bagged trees, decision trees, boosted trees, boosted stumps, etc. The accuracy of the trained content ranking model is evaluated using a validation set that was formed as a disjoint set of the data for testing the trained content ranking models to ensure the content ranking model generalizes to non-training data. Common metrics applied in accuracy measurement include: Precision=TP/(TP+FP) and Recall=TP/(TP+FN), where precision is how many the content ranking model correctly guessed (TP or true positives) out of the total it predicted (TP+FP or false positives) and recall is how many it correctly guessed (TP) out of the total that did represent the concept (TP+FN or false negatives). The F score (F-score=2*PR/ (P+R)) unifies the two into one measure, and the system can reject or iterate on the model as needed based on the accuracy measurement result. Ultimately, the trained content ranking model is used to rank unknown content items based on the same features being extracted from these unknown content items, as described herein.

Example features describing a content item include a topic of the content item (e.g., a topic related to sports, food, travel, or entertainment), a type of media included in the content item (e.g., a photo of a beach or a video of a concert), users associated with the content item (e.g., which user posted the content item or which user was tagged in the content item), or the popularity of the content item (e.g., based on a number of likes or comments received by users). Example features describing a user include a topic of content items that the user frequently interacts with (e.g., the user frequently interacts with content items about basketball, baseball, or football because the user is a sports fan), a type of media included in content items that the user frequently views (e.g., videos of movie trailers or cooking tutorials), or user profile information of the user (e.g., the user's demographic information or brand pages that the user has liked).

As the machine learning module 245 trains a content ranking model over time with sets of features, the trained content ranking model learns which types of content items a given user is most likely to interact with. For example, a user who is interested in sports is likely to frequently interact with content items related to topics about sports or including media showing athletes. Accordingly, a content ranking module 250 can use the trained content ranking model to determine more accurate ranking scores.

The content delivery module 260 retrieves a set of ranked content items from the content item store 240 and stores the set of ranked content items in the content item ordered set 265. In one embodiment, the content delivery module 260 receives a request from a client device 110 for content items. In response to the request, the content delivery module 260 provides content items from the content item ordered set 265 to the client device 110. In particular, the content delivery module 260 selects a subset of content items from the ordered set in the content item ordered set 265 to provide to the client device 110. The subset includes content items from the ordered set with the highest ranking score, e.g., content items that a user of the client device 110 is most likely to interact with. The content delivery module 260 removes content items from the content item ordered set 265 that have already been provided to the client device 110. Each time the content delivery module 260 receives another request from the client device 110, the content delivery module 260 selects an additional subset to provide to the client device 110. The content delivery module 260 may retrieve additional ranked content items from the content item store 240 to replenish the ordered set in the content item ordered set 265 if the ordered set is running out of content items. The number of content items in the subset may vary, e.g., based on a network connection of the client device 110.

In an embodiment, the content delivery module 260 determines the size of the subset of content items sent to the client device 110 at a certain time based on the network connection speed. More specifically, the content delivery module 260 determines the size of the subset of content items sent to the client device 110 at a certain time to be a value that is inversely proportionate to the network connection speed. Accordingly, the content delivery module 260 determines the size of the subset of content items to be larger if the network connection speed is slow and smaller if the network connection speed is fast.

For example, assume that a first client device has a reliable network connection (e.g., fast download speed or uninterrupted service). The content delivery module 260 selects a smaller number of content items for the subset because the first client device is likely able to request and receive content items at any time. In contrast, a second client device has an unreliable network connection (e.g., slow download speed or intermittent service). Thus, the content delivery module 260 selects a larger number of content items for the subset because the second client device may not be able to receive additional content items for a certain period of time (e.g., until network connection service is restored or once there is sufficient network bandwidth). In one embodiment, the content delivery module 260 receives information describing a client device's network connection from the client device 110. For example, the content delivery module 260 sends a request for network connection information to the client device, which provides the information in response to receiving the request. The content delivery module 260 stores the network connection information in the user profile store 200 along with identifying information of the client device 110 and/or the user of the client device 110. Thus, the content delivery module 260 retrieves the stored network connection information at a later time if new network connection information is not available in real time.

In an example use case, a user of the second client device has an intermittent network connection, for example, because the user is riding on an underground subway. After receiving a subset of content items, the second client device's network connection drops. Thus, the second client device is unable to receive additional content items for the next five minutes. If the number of content items in the subset is small, there is a high likelihood that the user will finish viewing all of the content items in the subset within the next five minutes. This is undesirable because the user will run out of new content items to view. On the other hand, if the number of content items in the subset is large, then there is a lower likelihood that the user will finish viewing all of the content items in the subset within the next five minutes. By the time the user does finish viewing the content items, the second client device may have recovered a network connection to receive additional subsets of new content items.

The content delivery module 260 provides requests to the content ranking module 250 to re-rank content items in the content item ordered set 265. In one embodiment, the content delivery module 260 provides a request to the content ranking module 250 after a predetermined duration of time has elapsed since the last time the content delivery module 260 provided a subset of content items to a client device. After the predetermined duration of time has elapsed, the online system 100 may have new information that the machine learning module 245 can use to re-train content ranking models. Thus, the content ranking module 250 can use the re-trained content ranking models to update ranking scores of content items. Based on updated ranking scores of content items in the content item ordered set 265, the content delivery module 260 modifies the order of content items in the content item ordered set 265. In an embodiment, the content delivery module 260 adjusts the predetermined duration based on various factors, for example, a rate of user interactions by connections of the user. For example, if the new information indicates that many connections of a user are currently interacting with the online system 100, the content delivery module 260 shortens the predetermined duration because there is a greater likelihood that the ranking scores of content items selected to be presented to the user will change. In particular, if the user's connections are commenting on a given content item, liking the content item, sharing the content item, or performing other interactions with the content item, the content ranking module 250 is likely to increase the ranking score of the given content item. On the other hand, if the user's connections are currently not interacting much with the online system 100, the content delivery module 260 increases the predetermined duration.

III. Client Device

Figure 2B:
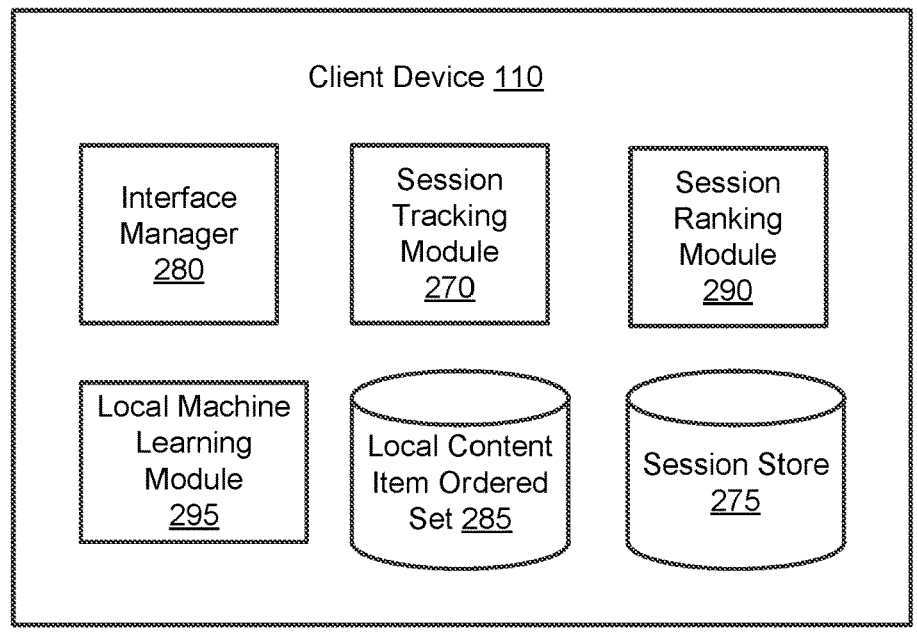
FIG. 2B is a block diagram of a client device for ranking content items based on session information according to one embodiment.

FIG. 2B is a block diagram of a client device 110 for ranking content items based on session information according to one embodiment. The client device 110 includes an interface manager 280, local content item ordered set 285, session tracking module 270, session store 275, session ranking module 290, and local machine learning module 295. In other embodiments, the client device 110 may include additional, fewer, or different components for various applications.

The interface manager 280 receives content items from the online system 100 that have been ranked by the online system 100, e.g., by the content ranking module 250 shown in FIG. 2B. The interface manager 280 stores the ranked content items in an ordered set in the local content item ordered set 285. The ordered set maintains the order of the ranked content items (e.g., from the content item ordered set 265), though the session ranking module 290 may later modify the order, which is further described below. The interface manager 280 generates a graphical user interface (e.g., the graphical user interface 140 shown in FIG. 1) to display the ranked content items on the client device 110 to a user. The interface manager 280 selects content items for display on the graphical user interface in an order based on ranking scores or session scores (further described below) of the content items. In particular, the interface manager 280 selects a content item with higher score (e.g., indicating a higher likelihood that the user will interact with the content item) for display before selecting a content item with a lower score. The interface manager 280 retrieves network connection information from a network coprocessor of the client device 110. The interface manager 280 provides the network connection information to the online system 100, e.g., in response to receiving a request from the online system 100 for network connection information.

The session tracking module 270 records session information and stores the session information in the session store 275. Session information describes actions performed by a user of the client device 110 during a session on the online system 100. For example, the actions include interacted content data, interaction data, and other types of data such as scroll speed data. Interacted content data describes content items that the user interacts with during the session, for example, a topic (e.g., sports, food, or pets) of the content items, a type of media (e.g., image or video) included in the content items, content of the media (e.g., an image of a beach or a video of a dog), other users of the online system 100 (e.g., other users connected to the user as friends) mentioned in the content items, text included in the content items, and the like. Interaction data describes the types of interactions performed by the user, e.g., viewing a video, viewing an image, clicking a URL, liking a content item, sharing a content item, commenting on a content item, and the like. The interaction data also comprises information describing the specific interaction, for example, a length of time interval for which the user views a content item, the number of times the user accesses or views a given content item, and so on. Scroll speed data indicates the speed at which the user scrolls through a set of content items on the graphical user interface of the client device 110. The speed may be represented as an average number of content items viewed per duration of time (e.g., second or minute). The speed may also indicate if the user pauses while scrolling through content items during the session and a length of the time interval for which the user pauses.

In one embodiment, the session tracking module 270 determines if the local content item ordered set 285 is running out of new content items, e.g., content items that have not already been displayed to the user. The session tracking module 270 sends a request to the online system 100 (e.g., the content delivery module 260) for additional content items when the number of new content items is lower than a threshold number of content items. The session tracking module 270 may adjust the threshold number based on a network connection of the client device 110. For instance, the threshold number is higher if the network connection is unreliable, e.g., to reduce the likelihood that the local content item ordered set 285 will run out of new content items. In an embodiment, the session tracking module 270 automatically sends the request without requiring a user to manually request additional content items, e.g., without requiring the user to select a button displayed on a graphical user interface of the client device 110.

The session ranking module 290 re-ranks content items from the local content item ordered set 285 based on information from the session store 275. In particular, the session ranking module 290 generates a session score for one or more of the content items. Similar to a ranking score generated by the content ranking module 250, the session score indicates a likelihood that a user of the client device 110 is interested in the corresponding content item or the likelihood that the user will interact with the content item. In contrast to the ranking scores generated by the online system 100, the session scores are based on session information that is not available to the online system 100. In addition, by re-ranking content items, the session ranking module 290 can merge newly received content items from the online system 100 with content items previously stored in the local content item ordered set 285. For example, a newly received content item may have a high session score and be moved ahead of a previously stored content item in the ordered set (which is not yet read by the user).

In one embodiment, the session ranking module 290 considers session scores for re-ranking during the corresponding session during which the session scores were generated. For example, a given content item has a first session score during a first session. After the first session ends, the first session score is no longer used. During a later second session, the session ranking module 290 generates a second session score for the given content item. The first session score may differ from the second session score because the two sessions have different types of session information. For example, a user may view content items about food in the first session and may view content items about movies in the second session. Similarly, the user may scroll slowly during a first session, for example, if the user had plenty of time, but the user may scroll quickly during a second session if the user was rushed for any particular reason. The session ranking module 290 considers these factors for ranking the content items. For example, the session ranking module 290 may rank content items that include large amount of text or videos having a longer duration lower if the scroll speed of the user if high because the user is unlikely to have time to view these types of content items.

In one embodiment, the session ranking module 290 generates a session score for each content item in the local content item ordered set 285. The session ranking module 290 re-ranks the content items in order of session scores, e.g., content items with higher session scores are ordered first. In other embodiments, the session ranking module 290 generates a session score for at least one, but not all, of the content items in the local content item ordered set 285. For instance, the session ranking module 290 generates session scores for content items including videos based on a user action with another content item including a video. However, in this instance, the session ranking module 290 does not generate session scores for content items that do not include a video. The session ranking module 290 re-ranks the content items in order of session scores and/or ranking scores.

In an embodiment, the session ranking module 290 compares session scores and ranking scores against each other. The session scores and ranking scores are normalized or mapped to the same range of values, e.g., a value from 0 to 10, where a higher score corresponds to a higher likelihood of interaction from a user. A first content item has a session score and a second content item does not have a session score. Thus, the session ranking module 290 compares the session score of the first content item against the ranking score of the second content item, e.g., because all content items from the online system 100 have a ranking score. The content item with the higher score (either ranking score or session score) will be ranked ahead of the other.

In other embodiments, instead of normalizing scores, each content item has a default session score that is based on the ranking score of the corresponding content item. For example, if the ranking score of a content item is 5.0, then the session ranking module 290 generates a default session score of 5.0 for the content item. Thus, the session ranking module 290 can use session scores to re-rank content items without having to compare session scores against ranking scores.

In some embodiments, the session tracking module 270 periodically uploads session information from the client device 110 to the online system 100 via the interface manager 280. However, uploading session information requires resources (e.g., processing power or time) of the client device 110. If the client device 110 has a slow network connection, uploading session information will take a long time, and thus the online system 100 will not be able to promptly re-rank content items and provide the re-ranked content items back to the client device 110. Further, if the client device 110 has no network connection, the client device 110 cannot upload session information to the online system 100.

In embodiments where the client device 110 is connected to the online system 100 via a data plan that requires compensation by the user to a provider of the network service for bandwidth, uploading session information too frequently may consume a large amount of data of the data plan. This is undesirable for users who have a limited amount of data for their data plan. For example, a user provides a base amount of compensation to the provider of the network service for one gigabyte (1 GB) of data bandwidth per month. Further, the data plan indicates that if the user uses more than 1 GB of data bandwidth per month, then the user needs to provide additional compensation to the provider. On the other hand, the client device 110 can re-rank content items locally using session information regardless of the network connection status. Ranking content items locally may be particularly useful for users who interact with the online system 100 using their client devices 110 in areas that often do not have a reliable network connection available (e.g., an underground subway or a rural area).

Ranking content items based on session information may also be advantageous because users' interests and actions may vary between different sessions. Accordingly, the session ranking module 290 analyzes keywords and topics associated with the content items that the user is interacting with, for example, based on text and metadata associated with the content items. The session ranking module 290 re-ranks remaining content items that the user has not viewed based on the keywords and topics. More specifically, the session ranking module 290 increases the score of remaining content items that matches the keywords and topics of the content items being accessed by the user in a current session. For example, assume that a user is feeling hungry during a first session. However, in a second session a few hours later, the user has eaten a meal and is no longer feeling hungry. During the first session, the session tracking module 270 records session information indicating the user has viewed content items with images of food on the user's client device 110. Based on the session information, the session ranking module 290 determines that the user is interested in interacting with content items including information about food (since the user is hungry). Thus, the session ranking module 290 re-ranks content items stored on the client device 110 such that other content items including information about food (e.g., an image of a salad or a video about how to blend fruit smoothies) have a greater session score. As a result, these content items are ranked toward the top of an ordered set of content items in the local content item ordered set 285 for presentation to the user.

In another example, assume that a user interacts with the online system 100 while the user is riding in an elevator. Since the elevator ride may only last for a short duration of time (e.g., a few minutes or less), the corresponding session will also be short in duration. During the session, the session tracking module 270 records session information indicating the user is quickly scrolling through an ordered set of content items. In particular, the user's scroll speed is faster than the user's average scroll speed by a threshold value (e.g., the user is scrolling through twice as many content items than on average). Based on the session information, the session ranking module 290 determines that the user is likely in a rush and will be interacting with content items for only a short duration of time. Thus, the session ranking module 290 re-ranks content items stored on the client device 110 such that other content items that may take more time to finish viewing have a lower session score (e.g., a video that lasts several minutes, long body of text, or a URL to a longer news article). As a result, these content items are ranked toward the bottom of an ordered set of content items for presentation to the user.

In yet another example, a user watches a video of a content item at the top of the ordered set during a session. The session tracking module 270 records session information indicating that the type of content accessed by the user during this session includes specific types of media objects, such as videos. Based on the session information, the session ranking module 290 determines that the user is likely interested in watching additional videos included in content items. Thus, the session ranking module 290 re-ranks content items stored on the client device 110 such that other content items that also have the same type of media objects (e.g., videos) have a greater session score.

The local machine learning module 295 uses machine learning techniques to train session ranking models. In some embodiments, the session ranking module 270 uses the trained session ranking models to generate session scores. The local machine learning module 295 trains the session ranking models using features extracted from training data based on information from the session store 275. The local machine learning module 295 can periodically re-train the session ranking models using features based on updated training data. Example features describe session specific information including interacted content data, interaction data, time of day during which interaction was performed, keywords and topics in content items with which the user interacted during the current session, and scroll speed data during the current session.

As the local machine learning module 295 trains a session ranking model over time with sets of features, the trained session ranking model learns which types of content items a given user is most likely to interact with during a certain session. For example, a user who starts a session in the evening after arriving home from the office is likely interested in content items about recent events on news, dinner options, or television programs broadcasting in the evening. Accordingly, the session ranking module 270 uses the trained session ranking model to determine more accurate session scores.

IV. Requesting Content Items

Figure 3C:
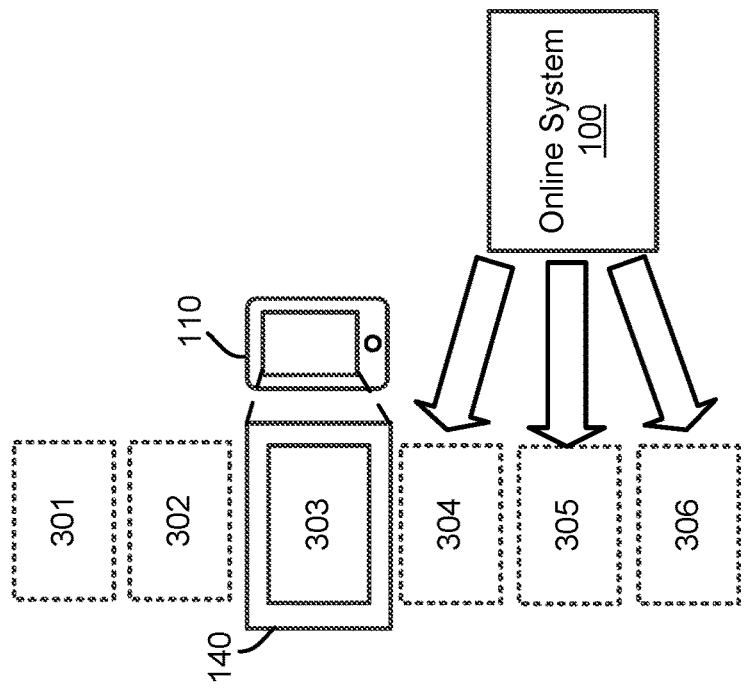
FIG. 3C is yet another diagram of the ordered set of content items for display on the client device according to one embodiment.
Figure 3B:
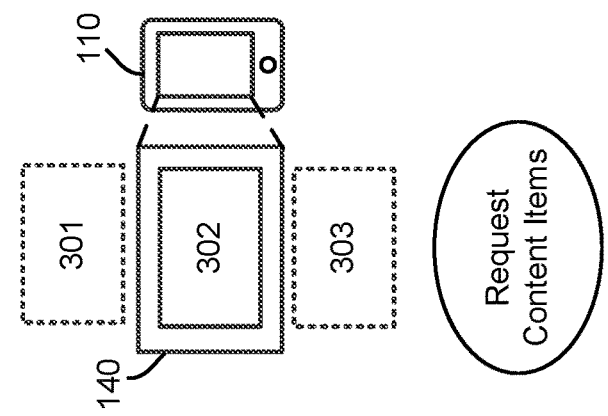
FIG. 3B is another diagram of the ordered set of content items for display on the client device according to one embodiment.
Figure 3A:
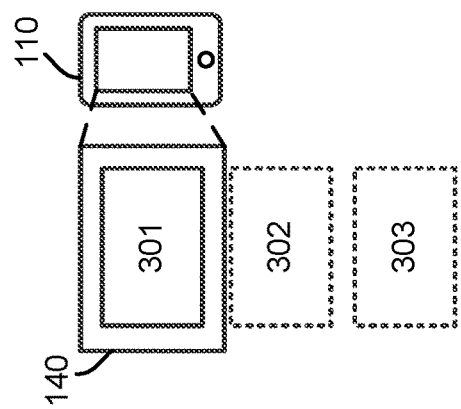
FIG. 3A is a diagram of an ordered set of content items for display on a client device according to one embodiment.

FIG. 3A is a diagram of an ordered set of content items for display on a client device 110 according to one embodiment. The ordered set of content items (e.g., from the local content item ordered set 285) includes, in order, content item 301, content item 302, and content item 303. Content item 301 is currently displayed on the graphical user interface 140 of the client device 110 to a user of the client device 110. Content items 302 and 303 are currently not displayed on the graphical user interface 140, as indicated by the dotted lines. The user may scroll through the ordered set of content items using the client device 110 to view the content items 302 and 303.

FIG. 3B is another diagram of the ordered set of content items for display on the client device 110 according to one embodiment. Content item 302 is currently displayed on the graphical user interface 140, while content items 301 and 303 are not currently displayed because the user has scrolled down the ordered set of content items. The session tracking module 270 of the client device 110 (shown in FIG. 2) sends a request to the online system 100 for additional content items based on a determination that the number of content items not yet viewed by the user is below a threshold number. For example, the threshold number of new content items is two. Thus, the session tracking module 270 sends the request because there is only one new content item left (i.e., content item 303) on the client device 110.

In some embodiments, the session tracking module 270 sends requests for additional content items based on factors different than—or in addition to—the threshold number of new content items. For instance, the session tracking module 270 sends the requests more frequently if the session information from the session store 275 indicates that the user is performing many actions during a particular session, e.g., because the user is likely to interact with more content items. In another example, the session tracking module 270 sends requests less frequently if the client device 110 has a weak network connection. To compensate for the reduced frequency of requests, the session tracking module 270 may request a larger number of new content items per each request.

FIG. 3C is yet another diagram of the ordered set of content items for display on the client device 110 according to one embodiment. The online system 100 provides new content items 304, 305, and 306 to the client device 110 in response to the request for additional content items. The session ranking module 290 appends the content items 304, 305, and 306 automatically to the end of the ordered set after content item 303. Thus, as the user continues to scroll through the ordered set of content items, the client device 110 does not run out of new content items to display to the user. The client device 110 provides the user with a continuous feed of content items on the graphical user interface 140 while scrolling down the ordered set. The client device 110 performs continuous feed that provides a desirable user experience because the user does not have to wait for new content items to load (e.g., since there is always an ordered set of content items ready for display). Additionally, the client device 110 appends new content items to the end of the ordered set, thereby obviating the need for the user to scroll back to the top of the ordered set to view new content items, e.g., if the new content items had instead been appended to the top of the ordered set.

V. Delivering Subsets of Content Items

Embodiments of the online system 100 are illustrated using two example use cases of delivering subsets of content items from the content item ordered set 265 of the online system 100 to the local content item ordered set 285 of the client device 110 are shown in FIGS. 4A-C and FIGS. 4D-F. The network connection of the client device 110 is assumed to be more reliable in FIGS. 4D-F than in FIGS. 4A-C. Thus, the content delivery module 260 selects a smaller number of content items to be included in the subsets (and thus provided to the client device 110) shown in FIGS. 4D-F than in the subsets shown in FIGS. 4A-C.

Figure 4C:
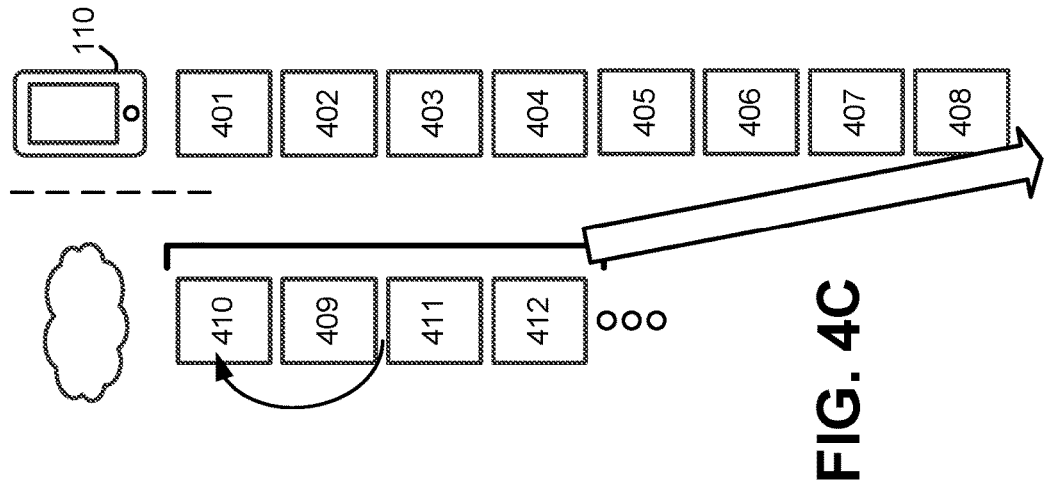
FIG. 4C is a diagram illustrating the step of providing a third subset of content items to the client device according to one embodiment.
Figure 4B:
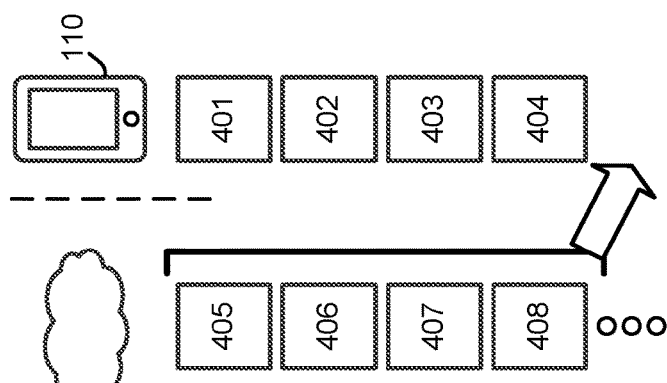
FIG. 4B is a diagram illustrating the step of providing a second subset of content items to the client device according to one embodiment.
Figure 4A:
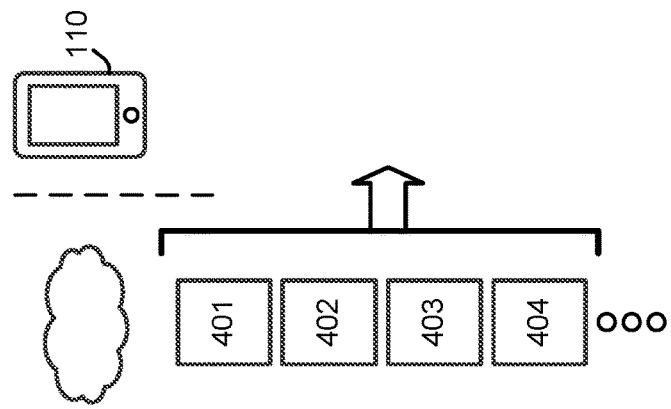
FIG. 4A is a diagram illustrating the step of providing a first subset of content items to a client device according to one embodiment.

FIG. 4A is a diagram illustrating the step of providing a first subset of content items to the client device 110 according to one embodiment. The first subset from the content item ordered set 265 includes the four content items 401, 402, 403, and 404 ranked by the content ranking module 250 of the online system 100. In particular, the ranking score of content item 401 is greater than the ranking score of content item 402, the ranking score of content item 402 is greater than the ranking score of content item 403, and so forth. Though only four content items are shown in FIG. 4A, the content item ordered set 265 can include any number of additional content items, as indicated by the ellipses.

FIG. 4B is a diagram illustrating the step of providing a second subset of content items to the client device 110 according to one embodiment. The content items from the first subset are illustrated as being stored in the client device 110. The second subset from the content item ordered set 265 includes the four content items 405 406, 407, and 408 ranked by the content ranking module 250. The second subset is appended after content item 404 to the ordered set of content items on the client device 110.

FIG. 4C is a diagram illustrating the step of providing a third subset of content items to the client device 110 according to one embodiment. The content items from the first subset and the second subset are illustrated as being stored in the client device 110. After providing the second subset to the client device 110, the content delivery module 260 sends a request to the content ranking module 250 to re-rank the content items in the content delivery module 260. As a result, the content delivery module 260 modifies the ranking score of content item 410. Since the modified ranking score of content item 410 is greater than the ranking score of content item 409, the content delivery module 260 re-orders content item 410 ahead of content item 409 in the ordered set. Thus, the third subset from the content item ordered set 265 includes the four content items in order of 410, 409, 411, and 412. The third subset is appended after content item 408 to the ordered set of content items on the client device 110.

Figure 4F:
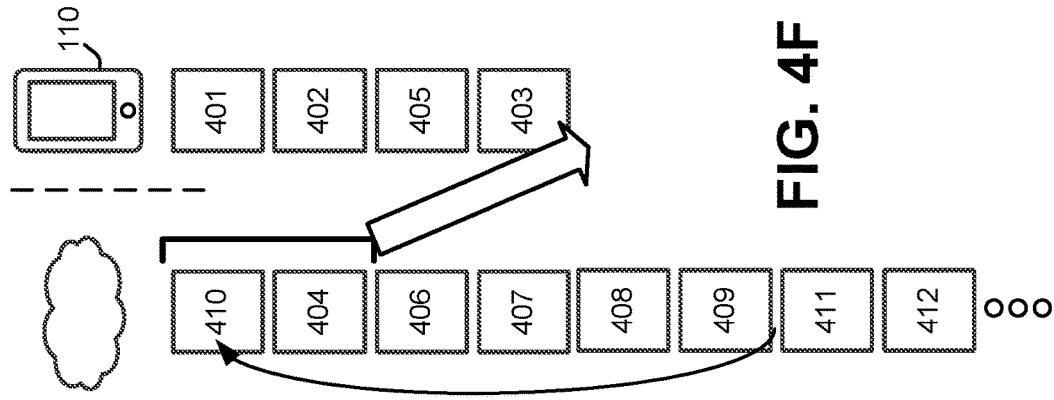
FIG. 4F is a diagram illustrating the step of providing a third subset of content items to the client device according to one embodiment.
Figure 4E:
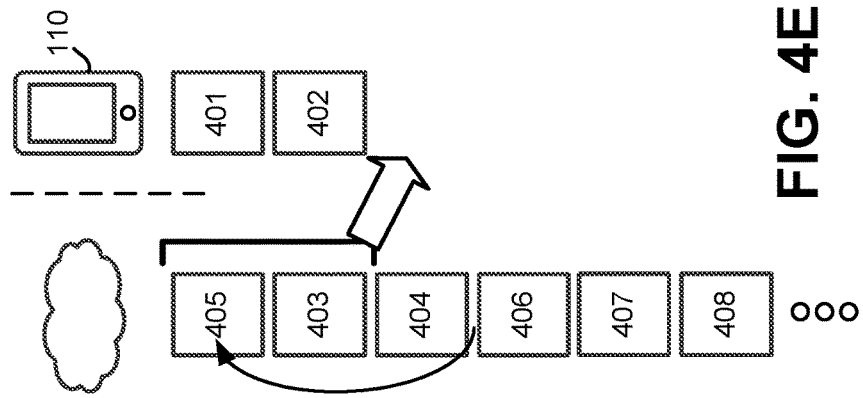
FIG. 4E is a diagram illustrating the step of providing a second subset of content items to the client device according to one embodiment.
Figure 4D:
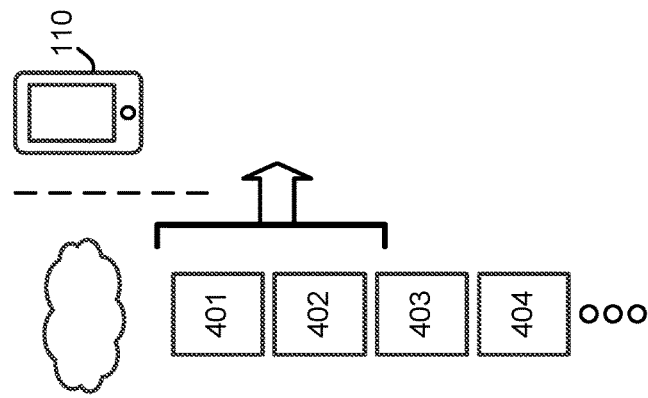
FIG. 4D is a diagram illustrating the step of providing a first subset of content items to a client device according to one embodiment.

FIG. 4D is a diagram illustrating the step of providing a first subset of content items to the client device 110 according to one embodiment. Similar to FIG. 4A, the online system 100 includes an ordered set of ranked content items 401, 402, 403, and 404. However, the subset provided to the client device 110 in FIG. 4D (and in FIGS. 4E-F) includes two content items instead of four content items. In particular, the first subset from the content item ordered set 265 includes the two content items 401 and 402.

FIG. 4E is a diagram illustrating the step of providing a second subset of content items to the client device 110 according to one embodiment. After providing the first subset to the client device 110, the content delivery module 260 sends a request to the content ranking module 250 to re-rank the content items in the content delivery module 260. As a result, the content delivery module 260 modifies the ranking score of content item 405. Since the modified ranking score of content item 405 is greater than the ranking score of content item 403, the content delivery module 260 re-orders content item 405 ahead of content item 403 in the ordered set. Thus, when the content delivery module 260 selects the second subset of two content items from the content item ordered set 265, the content delivery module 260 selects content items 405 and 403. The second subset is appended after content item 402 to the ordered set of content items on the client device 110.

FIG. 4F is a diagram illustrating the step of providing a third subset of content items to the client device 110 according to one embodiment. After providing the second subset to the client device 110, the content delivery module 260 again sends a request to the content ranking module 250 to re-rank the content items in the content delivery module 260. As a result, the content delivery module 260 modifies the ranking score of content item 410. Since the modified ranking score of content item 410 is greater than the ranking score of content item 404, the content delivery module 260 re-orders content item 410 ahead of content item 404 in the ordered set. Thus, when the content delivery module 260 selects the third subset of two content items from the content item ordered set 265, the content delivery module 260 selects content items 410 and 404. The third subset is appended after content item 403 to the ordered set of content items on the client device 110.

The content item ordered set 265 of the online system 100 includes the same content items ranked in the same initial order in the example use cases shown in both FIGS. 4A-C and FIGS. 4D-F. However, the local content item ordered set 285 of the client device 110 shown in FIG. 4C includes different content items than that shown in FIG. 4F. In particular, the local content item ordered set 285 in FIG. 4C includes content items 401, 402, 403, 404, 405, 406, 407, and 408, while the local content item ordered set 285 in FIG. 4F includes content items 401, 402, 405, and 403. In the latter use case, since the content delivery module 260 selects smaller subsets of content items, the content ranking module 250 is able to re-rank more content items on the online system 100 before providing the content items to the client device 110.

As a result, the ranking of the content items in the ordered set shown in FIG. 4F is more up-to-date than that of the ordered set shown in FIG. 4C. Specifically, content item 405 is ranked third in the ordered set in FIG. 4C, while content item 405 is ranked fifth in the ordered set in FIG. 4F. For example, after the first subset of content items has been provided to the client device 110, the online system 100 receives new information associated with the content item 405. In particular, the new information indicates that several users of the online system recently interacted with the content item 405 (e.g., shared the content item 405 with their friends, liked the content item 405, or commented on the content item 405). Based on the new information, the content ranking module 250 re-ranks the content item 405 to be ordered higher on the ordered set.

Additionally, content item 410 would be appended to the local content item ordered set 285 as the ninth content item in FIG. 4C, while content item 410 would be appended to the local content item ordered set 285 as the fifth content item in FIG. 4F. Accordingly, it is advantageous for the content delivery module 260 to select subsets with a smaller number of content items when the client device 110 has a reliable network connection. When the client device 110 does not have a reliable network connection, the content delivery module 260 considers the tradeoff between the two goals: ensuring that the local content item ordered set 285 does not run out of new content items and keeping the ranking scores of content items in the local content item ordered set 285 updated. In particular, the content delivery module 260 prioritizes the former goal over the latter goal.

VI. Session Ranking Model

Figure 5A:
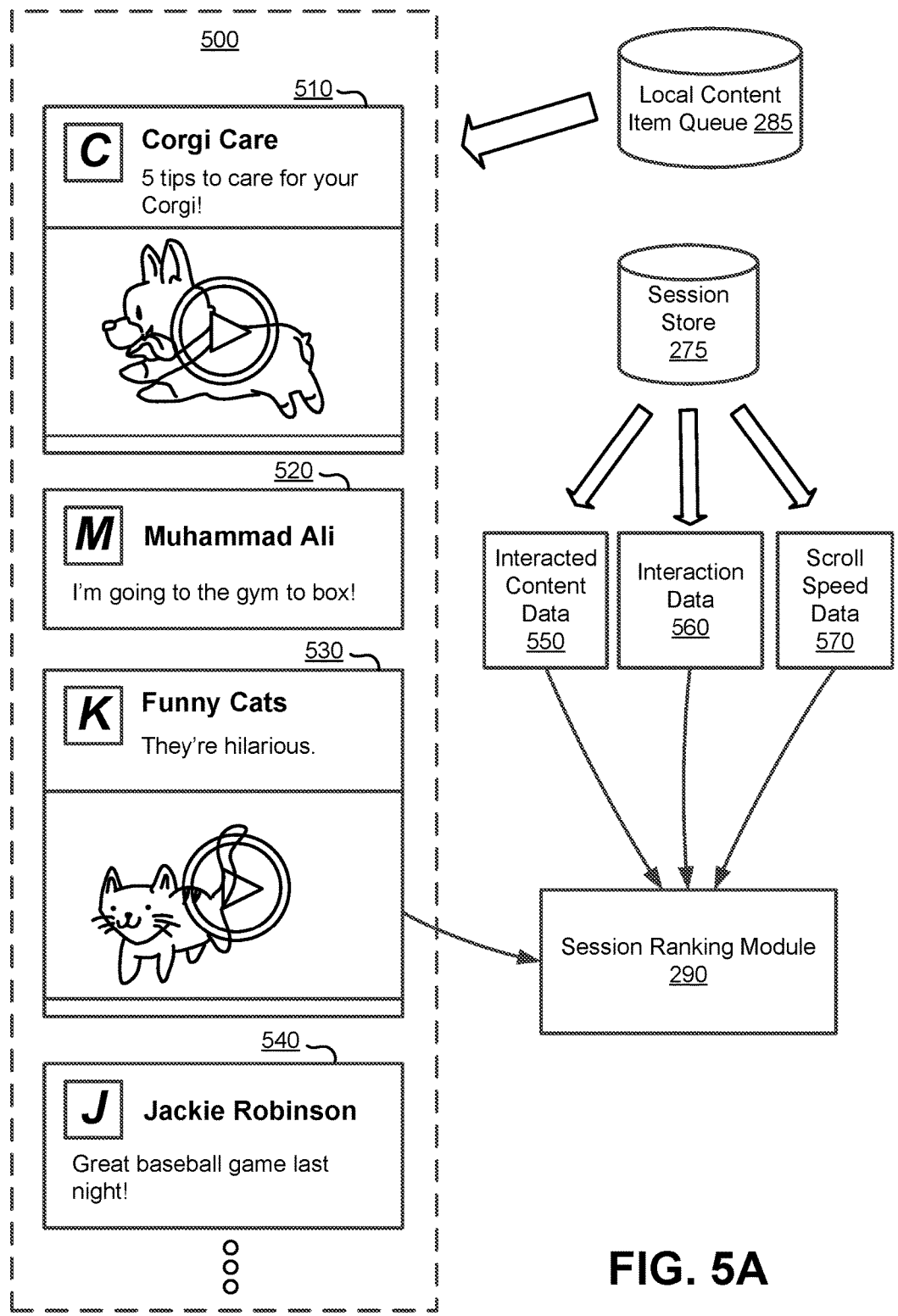
FIG. 5A is a data flow diagram of a session ranking module according to one embodiment.

FIG. 5A is a data flow diagram of the session ranking model 290 according to one embodiment. The session ranking model 290 retrieves the ordered set 500 of content items from the local content item ordered set 285. The ordered set 500 of content items includes at least content item 510 with a video about "corgi care," content item 520 with a comment from Muhammad Ali (e.g., a user of the online system 100), content item 530 with a video about "funny cats," and content item 540 including a comment from Jackie Robinson (e.g., another user of the online system 100). Though only four content items are shown in FIG. 5A, in practice, the local content item ordered set 285 typically stores a larger number of content items queued for presentation to a user of the client device 110. For instance, as indicated by the ellipses in FIG. 5A, there may be any number of additional content items not shown in FIG. 5A. Any of additional content items may be ranked after content item 540, ahead of the content item 510, or in between any of the content items in the ordered set 500.

The content ranking model 250 of the online system 100 (shown in FIG. 2A) previously ranked the content items 510, 520, 530, and 540 based on how likely the user is interested in viewing or interacting with each of the content items. For example, the content ranking model 250 ranked the content item 510 first among the four content items because the user has a strong affinity to dogs based on the user's profile or past actions on the online system 100, e.g., the user visited brand pages of pet stores, viewed videos of corgi dogs, commented on content items about dogs, or indicated that the user owns a pet dog.

Figures 5B, 5C:
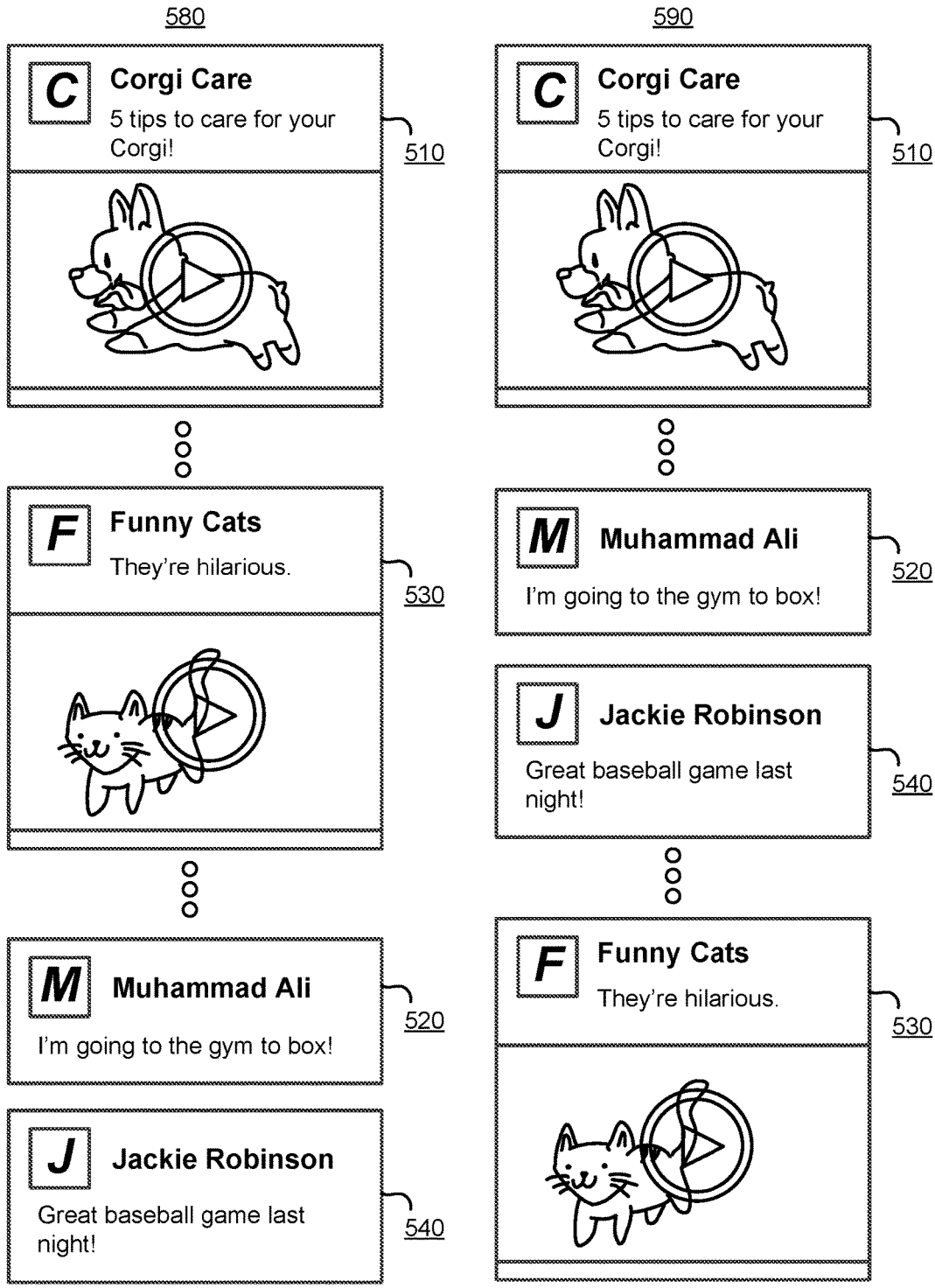
FIG. 5B is a diagram of content items ranked based on session information according to one embodiment.
FIG. 5C is another diagram of content items ranked based on session information according to one embodiment.

The session ranking model 290 also retrieves the interacted content data 550, interaction data 560, and scroll speed data 570 from the session store 275. The session ranking model 290 takes as input a candidate content item from the ordered set 500 and the information from the session store 275. Based on the input, the session ranking model 290 generates a session score for the candidate content item. The session ranking model 290 generates a session score for any number of candidate content items from the ordered set 500. FIGS. 5A-B show two different example sessions in which the session ranking model 290 re-ranks the ordered set 500 of content items based on session scores.

FIG. 5B is a diagram of content items ranked based on session information according to one embodiment. The ordered set 580 of content items includes re-ranked content items from the ordered set 500 of content items shown in FIG. 5A.

In an example session, the client device 110 displays the content item 510 to the user. The user plays the video of content item 510 about "corgi care," and the session tracker module 270 records the action of playing the video. Based on the action, the interacted content data 550 indicates the user viewed a content item including information about pet animals, the interaction data 560 indicates that the user viewed a video, and the scroll speed data 570 indicates that the user paused to view the video. Thus, the session ranking module 290 generates a higher session scores for content item 530 than for content items 520 and 540 because the content item 530 includes a video about pet animals (e.g., funny cats). On the other hand, content items 520 and 540 have text only. Accordingly, the client device 110 will present the content item 530 to the user before presenting the content items 520 and 540.

FIG. 5C is another diagram of content items ranked based on session information according to one embodiment. The ordered set 590 of content items includes re-ranked content items from the ordered set 500 of content items shown in FIG. 5A.

In an example session different than the example session described with reference to FIG. 5B, the client device 110 displays the content item 510 to the user. Rather than playing the video of content item 510 about "corgi care," the user quickly scrolls to the next content item in the ordered set, and the session tracker module 270 records these actions. Based on these actions, the interacted content data 550 indicates the user skipped a content item about pet animals, the interaction data 560 indicates that the user skipped watching a video, and the scroll speed data 570 indicates that the user has a fast scroll speed. Thus, the session ranking module 290 generates a lower session score for content item 530 than for content items 520 and 540 because the content item 530 includes a video. Accordingly, the client device 110 presents the content items 520 and 540 to the user before presenting the content items 530.

VII. Example Process Flows

VII. A. Server Side

Figure 6:
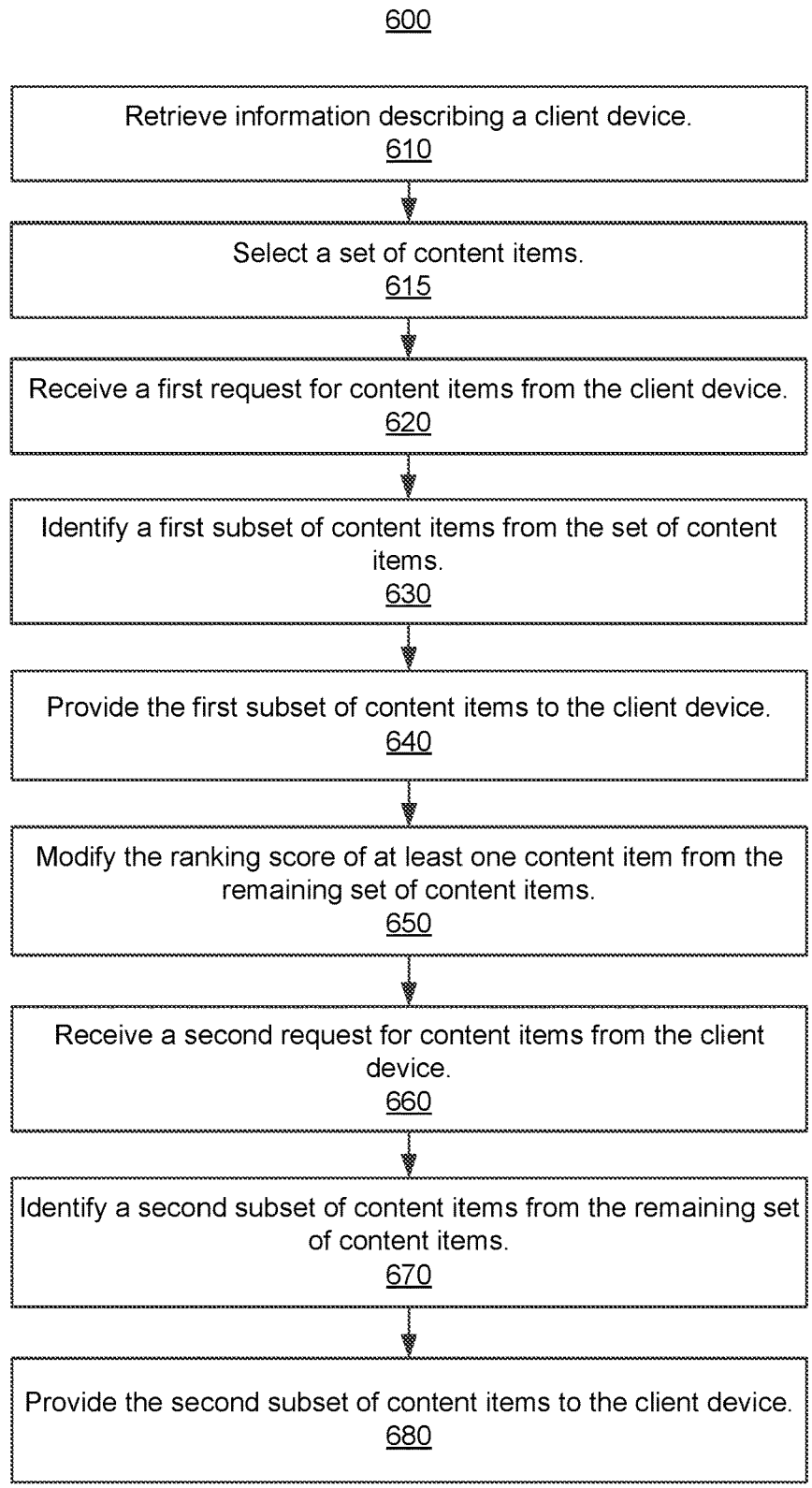
FIG. 6 is a flowchart illustrating a process for providing subsets of content items from an online system to a client device according to one embodiment.

FIG. 6 is a flowchart illustrating a process 600 for providing subsets of content items from the online system 100 to the client device 110 according to one embodiment. In some embodiments, the process 600 is used by the online system 100—e.g., modules of the online system 100 described with reference to FIG. 2A—within the system environment in FIG. 1. The process 600 may include different, fewer, or additional steps than those described in conjunction with FIG. 6 in some embodiments or perform steps in different orders than the order described in conjunction with FIG. 6.

The content delivery module 260 retrieves 610 information describing a client device 110. The information may indicate a strength or reliability of the client device's network connection. The content delivery module 260 selects 615 a set of content items (e.g., an ordered set) for sending to the client device 110, where each content item is ranked by the online system 100 and has a ranking score (e.g., generated by the content ranking module 250). The content item ordered set 265 stores the set of content items. The content delivery module 260 receives 620 a first request for content items from the client device 110. The content delivery module 260 identifies 630 a first subset of content items from the set of content items based on the ranking scores of the content items. The content delivery module 260 selects a certain number of content items to be included in the first subset based on the information describing the client device. For example, if the information indicates that the client device's network connection is reliable, then the content delivery module 260 selects a smaller number of content items for the subset (compared to the number of content items selected if the network connection is unreliable). The content delivery module 260 provides 640 the first subset of content items to the client device 110.

The content ranking model 250 modifies 650 the ranking score of at least one content item from the set of content items. In an embodiment, content ranking model 250 modifies ranking score based on interactions performed by users of the online system 100 after the first subset of content items has been provided to the client device 110. For example, after the first subset has been provided to the client device 110, several users interact with a given content item in the set of content items, for example, by liking the content item, commenting on the content item, sharing the content item, accessing the content item, and so on. The content ranking model 250 increases the ranking score of the given content item because the given content item may be trending in popularity, and thus a target user of the online system 100 is more likely to be interested in the given content item.

In one embodiment, the content item generator 235 generates or retrieves new content items after the content delivery module 260 provides the first subset of content items to the client device 110. The new content items may not be available before the first subset is provided because the new content items are based on interactions performed by users of the online system 100 after the first subset has been provided. The content ranking model 250 adds the new content items to the set of content items and can rank the new content items along with the existing content items in the set. Thus, the new content items may be mixed in with the existing content items that are selected to be included in a subset to be provided to the client device 110.

The content delivery module 260 receives 660 a second request for content items from the client device 110. The content delivery module 260 identifies 670 a second subset of content items from the remaining set of content items, e.g., based on the ranking scores of the content items. Similar to the step 630, the content delivery module 260 may select a certain number of content items to be included in the second subset based on the information describing the client device 110. The second subset can also include a content item with a modified ranking score, e.g., modified in step 650. The content delivery module 260 provides 680 the second subset of content items to the client device 110.

VII. B. Client Side

Figure 7:
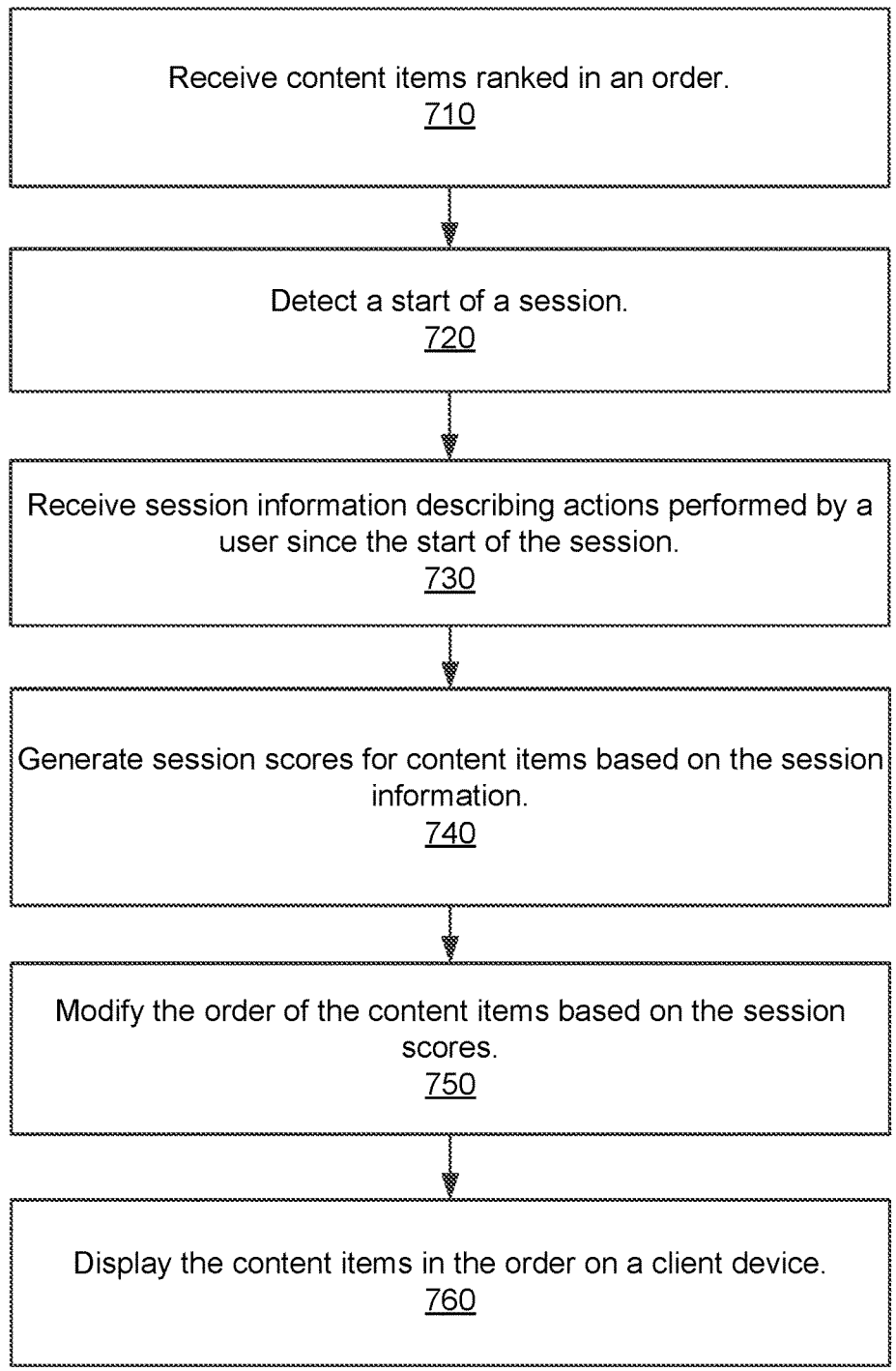
FIG. 7 is a flowchart illustrating a process for ranking content items based on session information according to one embodiment.

FIG. 7 is a flowchart illustrating a process 700 for ranking content items based on session information according to one embodiment. In some embodiments, the process 700 is executed by the client device 110—e.g., modules of the client device 110 described with reference to FIG. 2B—within the system environment in FIG. 1. The process 700 may include different, fewer, or additional steps than those described in conjunction with FIG. 7 in some embodiments or perform steps in different orders than the order described in conjunction with FIG. 7.

The client device 110 receives 710 content items ranked in an order by the online system 100. The order is based on each content item's ranking score, e.g., generated by the content ranking module 250 (shown in FIG. 2A). The local content item ordered set 285 stores the received content items, e.g., in an ordered set. The session tracking module 270 detects 720 a start of a session, where a session is associated with a sequence of interactions between the client device 110 and the online system 100. The session tracking module 270 receives 730 session information describing actions performed by a user of the client device 110 since the start of the session. The session ranking module 290 generates session 740 scores for the content items based on the session information. The session ranking module 290 may generate session scores for one or more (but not necessarily all) of the content items. Similar to the ranking scores, the session scores each indicate a likelihood of the user interacting with the corresponding content item. The session ranking module 290 modifies 750 the order of the content items based on the session scores. For example, a first content item with a session score greater than the session score (or ranking score) of a second content item is ordered higher in the ordered set. The client device 110 displays 760 the content items in the order on the client device 110 for presentation to the user.

Although the process 700 illustrated in FIG. 7 is described as being executed on the client device 110, the process 700 (or one or more steps of the process 700) may be executed on the online system 100 by transferring relevant information from the client device 110 to the online system 100. The online system 100 determines the ranking of the content items based on the session information and sends the ranked content items to the client device 110. The client device 110 presents the content items in the ranked order provided by the online system 100.

VIII. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by a client device of a user, a plurality of content items ranked in an order by an online system;
   detecting a start of a session, the session associated with a sequence of interactions between the client device and the online system;
   receiving session information describing actions associated with the online system performed by the user using the client device since the start of the session, wherein the session information indicates that a number of unread content items stored on the client device is below a threshold value, the threshold value based on a network connection strength of the client device;
   providing the session information as input to a machine learning model trained using information describing interactions with content items previously performed by the user;
   generating, by the machine learning model based on the input, one or more session scores, each session score associated with one of the plurality of content items and indicating a likelihood of the user interacting with the corresponding content item;
   modifying the order of a plurality of unread content items of the plurality of content items based on the one or more session scores of the content items; and
   displaying the plurality of content items on the client device in the modified order.

2. The method of claim 1, wherein the session information indicates whether the user viewed a video of a previously displayed content item, and wherein generating the one or more session scores comprises weighing content items that include a video higher than content items without videos.

3. The method of claim 1, wherein the session information indicates that the user is viewing content items of the plurality of content items at a speed that is faster than an average speed at which the user viewed content items before the session.

4. The method of claim 3, wherein modifying the order of the plurality of unread content items of the plurality of content items comprises ranking a first content item of the plurality of content items in the order ahead of a second content item of the plurality of content items, wherein the first content item does not include a video, and wherein the second content item includes a video.

5. The method of claim 1, wherein each content item of the plurality of content items has a ranking score generated by the online system, and wherein the session scores are further based on the ranking score of the corresponding content item.

6. The method of claim 1, further comprising providing the session information to the online system at a rate based on the network connection strength of the client device.

7. The method of claim 1, wherein the machine learning mode is trained to learn one or more types of content items with which the user is likely to interact.

8. The method of claim 1, wherein the machine learning mode is re-trained with new information including interactions with the plurality of content items on the client device in the modified order performed by the user.

9. A method comprising:
   receiving, by a client device of a user, a plurality of content items ranked in a first order by an online system;
   detecting a start of a first session, the first session associated with a sequence of interactions between the client device and the online system;
   modifying, using a machine learning model trained using information describing interactions with content items previously performed by the user, a first plurality of unread content items in the first order of the plurality of content items to a second order by:
      providing a first set of session information as input to the machine learning model, the first set of session information describing actions associated with the online system performed by the user using the client device since the start of the first session, wherein the first set of session information indicates that a number of unread content items stored on the client device is below a threshold value, the threshold value based on a network connection strength of the client device;
   detecting an end of the first session;
   detecting a start of a second session;
   modifying, using the machine learning model based on a second set of session information as another input, a second plurality of unread content items in the second order of the plurality of content items to a third order, the second set of session information describing actions performed by the user using the client device since the start of the second session; and
   displaying the plurality of content items on the client device in the third order.

10. The method of claim 9, wherein the second set of session information indicates that the user is viewing content items of the plurality of content items at a speed that is faster than a speed at which the user viewed content items before the second session.

11. The method of claim 10, wherein modifying the second plurality of unread content items in the second order of the plurality of content items comprises ranking a first content item of the plurality of content items in the second order ahead of a second content item of the plurality of content items, wherein the first content item does not include a video, and wherein the second content item includes a video.

12. The method of claim 9, further comprising providing the first set of session information and the second set of session information to the online system at a rate based on the network connection strength of the client device.

13. A computer program product comprising a non-transitory computer readable storage medium having instructions encoded thereon that, when executed by a processor, cause the processor to:
receive, by a client device of a user, a plurality of content items ranked in an order by an online system;
detecting a start of a session, the session associated with a sequence of interactions between the client device and the online system;
receive session information describing actions associated with the online system performed by the user using the client device since the start of the session, wherein the session information indicates that a number of unread content items stored on the client device is below a threshold value, the threshold value based on a network connection strength of the client device;
provide the session information as input to a machine learning model trained using information describing interactions with content items previously performed by the user;
generate, by the machine learning model based on the input, one or more session scores, each session score associated with one of the plurality of content items and indicating a likelihood of the user interacting with the corresponding content item;
modify the order of a plurality of unread content items of the plurality of content items based on the one or more session scores of the content items; and
display the plurality of content items on the client device in the modified order.

14. The non-transitory computer readable storage of claim 13, wherein the session information indicates whether the user viewed a video of a previously displayed content item, and wherein generating the session score comprises weighing content items that include a video higher than content items without videos.

15. The non-transitory computer readable storage of claim 13, wherein the session information indicates that the user is viewing content items of the plurality of content items at a speed that is faster than an average speed at which the user viewed content items before the session.

16. The non-transitory computer readable storage of claim 15, wherein modify the order of the plurality of unread content items of the plurality of content items comprises rank a first content item of the plurality of content items in the order ahead of a second content item of the plurality of content items, wherein the first content item does not include a video, and wherein the second content item includes a video.

17. The non-transitory computer readable storage of claim 13, wherein each content item of the plurality of content items has a ranking score generated by the online system, and wherein the session scores are further based on the ranking score of the corresponding content item.

18. The non-transitory computer readable storage of claim 13, having further instructions that when executed by the processor cause the processor to provide the session information to the online system at a rate based on the network connection strength of the client device.

* * * * *